United States Patent [19]

Liaw et al.

[11] Patent Number: 5,395,900
[45] Date of Patent: Mar. 7, 1995

[54] ACRYLATED EPOXY RESINS BASED ON BISPHENOL-S AND PREPARATION THEREOF

[75] Inventors: Der-Jan Liaw, Taipei; Wen-Chang Shen, Tao Yuan Hsien, both of Taiwan, Prov. of China

[73] Assignee: National Science Council, Taipei, Taiwan, Prov. of China

[21] Appl. No.: 127,328

[22] Filed: Sep. 27, 1993

[51] Int. Cl.$^6$ ............................................ C08F 283/00
[52] U.S. Cl. ..................................... 525/531; 525/532; 525/922; 528/107; 528/112
[58] Field of Search ...................... 525/531, 922, 532; 528/112, 107

[56] References Cited

U.S. PATENT DOCUMENTS

| | | | |
|---|---|---|---|
| 3,790,602 | 2/1974 | Bluestein et al. | 260/348.6 |
| 4,014,771 | 3/1977 | Rosenkranz et al. | 525/922 |
| 4,119,640 | 10/1978 | Hodakowski | 549/560 |
| 4,233,130 | 11/1980 | Borden et al. | 522/33 |
| 4,293,678 | 10/1981 | Carter et al. | 528/32 |
| 4,357,219 | 11/1982 | Sattler | 525/455 |
| 4,465,806 | 8/1984 | Lee | 525/922 |
| 4,847,337 | 7/1989 | Hefner, Jr. | 525/531 |
| 4,981,743 | 1/1991 | Ho | 430/945 |
| 5,196,481 | 3/1993 | Owens et al. | 525/108 |

OTHER PUBLICATIONS

Der-Jang Liaw, et al., "Curing kinetics of epoxy resins based on bisphenol-S and its derivatives" Die Angewandte Makromolekulare Chemie 200 Oct. 13, 1992, 137–146.

Der-Jang Liaw et al., "Synthesis of epoxy resins based on bisphenol-S and its derivatives" Die Angewandte Makromolekulare Chemie 200 Sep. 25, 1992, 171–190.

*Primary Examiner*—Melvyn I. Marquis
*Assistant Examiner*—Randy Gulakowski
*Attorney, Agent, or Firm*—W. Wayne Liauh

[57] ABSTRACT

An acrylated epoxy resin based on bisphenol-S having a formula as follows

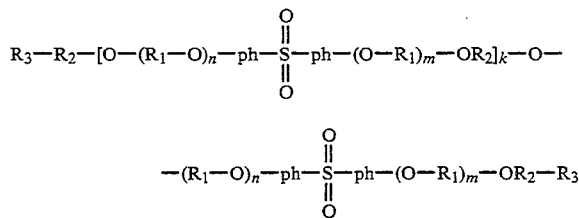

wherein ph is phenylene or halophenylene;
$R_1$ is $C_2$-$C_4$ alkylene;
$R_2$ is —$CH_2CH(OH)CH_2$—;
$R_3$ is acryloyl or methacryloyl;
m is 0–4 integer, n is 0–4 integer and k is 0–5 integer.

6 Claims, 4 Drawing Sheets

ACRYLATED EPOXY RESINS BASED ON BISPHENOL-S AND PREPARATION THEREOF

FIELD OF THE INVENTION

The present invention is related to epoxy resins based on 4,4'-dihydroxydiphenyl sulfone, abbreviated to bisphenol-S, especially to acrylated epoxy resins based on bisphenol-S.

BACKGROUND OF THE INVENTION

Epoxy resins are widely used in protective coatings, high performance compositions, adhesives, and fiber-reinforced composites. Among these epoxy resins, those based on bisphenol-A currently play a leading role. In recent years, due to the escalated requirements for epoxy resins having improved physical and chemical properties many attempts have been carried out in order to synthesize more chemical, solvent and high temperature resistant, and durable epoxy resins.

The material containing bisphenol-S is of interest as an intermediate in the preparation of high temperature resistant thermoset and thermoplastic polymer for various end use applications. For instance, epoxy resin based on bisphenol-S has the advantage of resistance to deformation by heat and thermal stability. Such improved epoxy resins from bisphenol-S have other advantages in briefer gel periods and more rapid development of mechanical properties in cured systems, better resistance to organic solvent attack, increased dimensional stability and better wetting of glass reinforcement. [See J. C. Spitsbergen, P. Loewrigkeit, C. Bluestein, J. Sugarman and W. L. Lauze, 26th annu. Techn. Conf. Reinforced Plastics/Composites Division, The Society of the Plastics Industry, Inc. Section 19-C, P.1, (1971); and D. J. Liaw and W. C. Shen, Angew. Makromol. Chem. 199, 171 (1992)] Although epoxy resins based on bisphenol-S have better thermal resistance and mechanical strength than those of epoxy resins based on bisphenol-A, the bisphenol-S type epoxy resins suffer from lack of flexibility in comparison with the bisphenol-A type epoxy resins. Therefore, even though U.S. Pat. No. 3,790,602 discloses an accelerated process for preparing bisphenol-S diglycidyl ethers, the epoxy resins based on bisphenol-S are not produced in large scale up to the present, and there is still a need for epoxy resins having improved flexibility and comparable performance in mechanical strength at the same time.

An object of the present invention is to provide novel bisphenol-S type epoxy resins having improved flexibility and comparable mechanical performance compared to the prior art epoxy resins.

SUMMARY OF THE INVENTION

In order to achieve the object of the present invention, an acrylated epoxy resin based on bisphenol-S having a formula as follows is disclosed

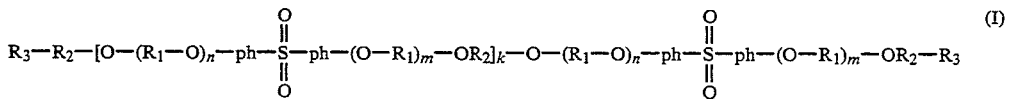

wherein ph is phenylene or halophenylene;
$R_1$ is $C_2$-$C_4$ alkylene;
$R_2$ is —$CH_2CH(OH)CH_2$—;
$R_3$ is acryloyl or methacryloyl;
m is 0–4 integer, n is 0–4 integer and k is 0–5 integer.

Preferably, ph is phenylene, and $R_1$ is ethylene or propylene.

DETAILED DESCRIPTION OF THE INVENTION

Figure 1:
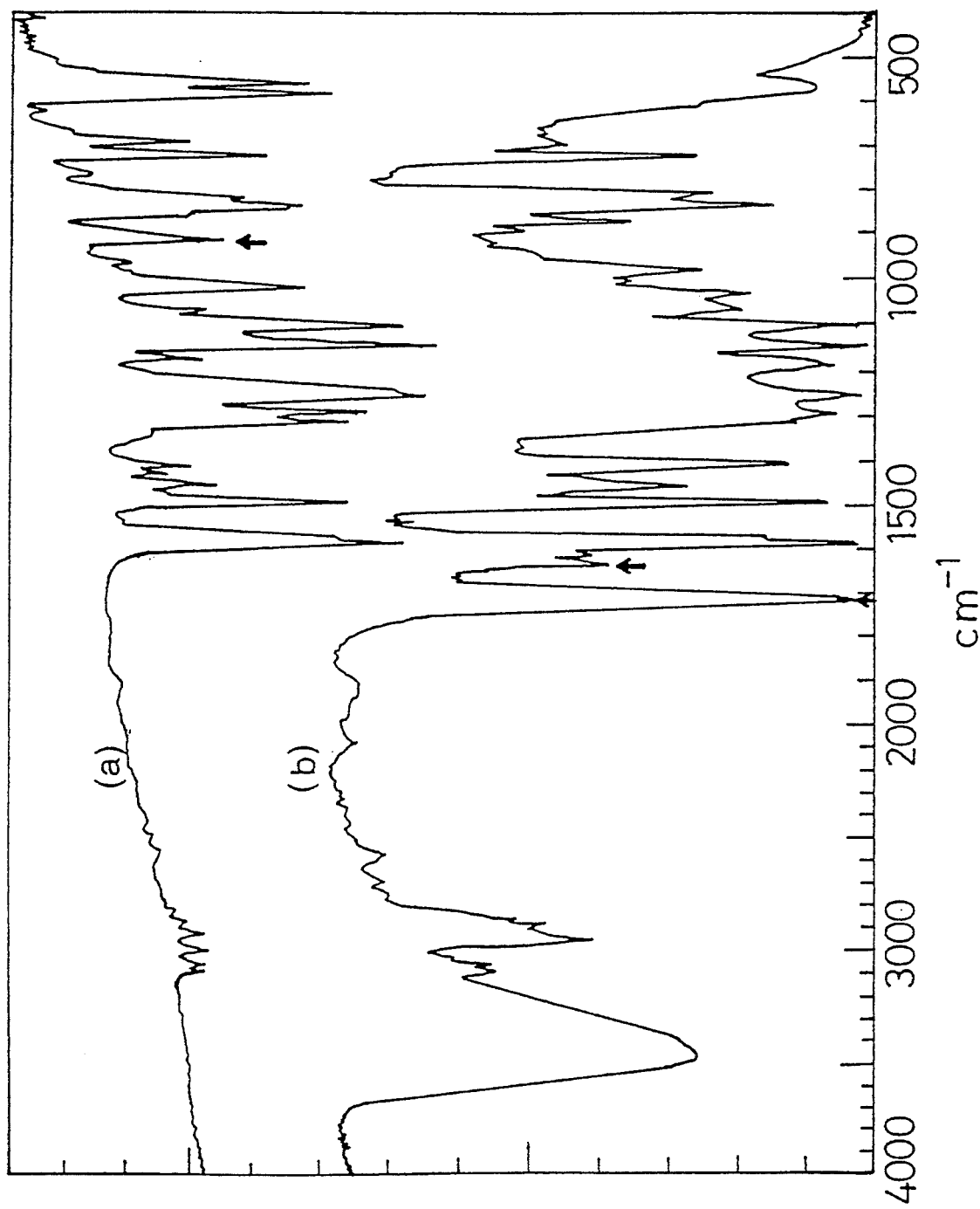
FIG. 1 is an IR spectra of diglycidyl ether of bisphenol-S and acrylated diglycidyl ether of bisphenol-S, wherein (a) is diglycidyl ether of bisphenol-S, and (b) is acrylated diglycidyl ether of bisphenol-S.

The present invention is related to acrylated epoxy resins based on 4,4'-dihydroxydiphenyl sulfone, abbreviated to bisphenol-S, which can be represented by the following formula

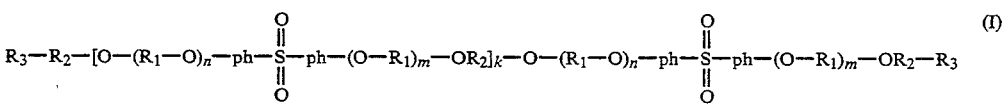

wherein ph is phenylene or halophenylene;
$R_1$ is $C_2$-$C_4$ alkylene;
$R_2$ is —$CH_2CH(OH)CH_2$—;
$R_3$ is acryloyl or methacryloyl;
m is 0–4 integer, n is 0–4 integer and k is 0–5 integer.

When m and n of the formula (I) are both zero and ph is phenylene, a suitable process for preparing the acrylated bisphenol-S type epoxy resin of formula (I) comprises:

a) conducting a condensation reaction of bisphenol-S and epichlorohydrin to form an diglycidyl ether of bisphenol-S; and b) reacting the diglycidyl ether of bisphenol-S with an acrylic acid or methacrylic acid in an equivalent ratio of 1:1 to form the acrylated diglycidyl ether of bisphenol-S.

When acrylic acid is used in step b), the reaction thereof can be represented by the following chemical reaction formula

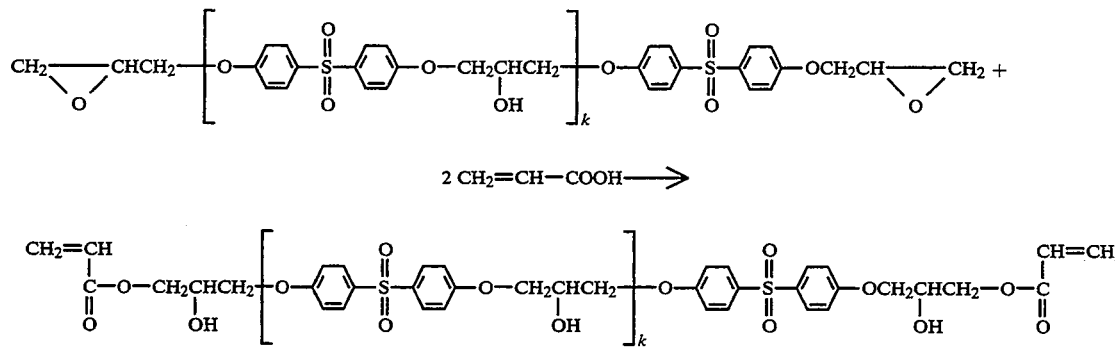

wherein K is 0–5 integer.

In order to improve the flexibility of the reaction product acrylated diglycidyl ether of bisphenol-S in step b), it is preferred that m and n of formula (I) are both not zero, i.e. bisphenol-S used in step a) is replaced by oxyalkylene-extended bisphenol-S. In accordance with one of the preferred embodiments of the present invention, the oxyalkylene-extended bisphenol-S can be prepared by reacting bisphenol-S with ethylene carbonate, propylene carbonate or butylene carbonate as shown by the following chemical reaction formula

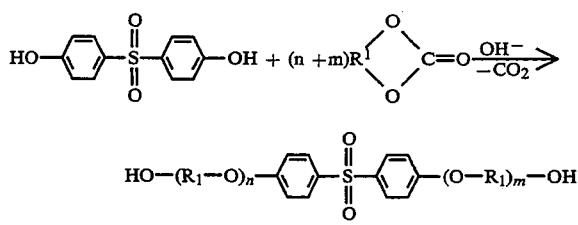

wherein $R_1$ is $C_2-C_4$ alkylene; m and n are 1–4 integer.

Now the acrylated bisphenol-S type epoxy resin of formula (I) having both m and n greater than zero can be prepared by a process comprising a series of steps similar to said steps a) and b) except that bisphenol-S used in step a) is replaced by oxyalkylene-extended bisphenol-S. Said process comprises:

a') conducting a condensation reaction of oxyalkylene-extended bisphenol-S and epichlorohydrin to form an diglycidyl ether of oxyalkylene-extended bisphenol-S; and b') reacting the diglycidyl ether of oxyalkylene-extended bisphenol-S with an acrylic acid or methacrylic acid in an equivalent ratio of 1:1 to form the acrylated diglycidyl ether of oxyalkylene-extended bisphenol-S.

The condensation reaction in step a') can be represented by the following chemical reaction formula

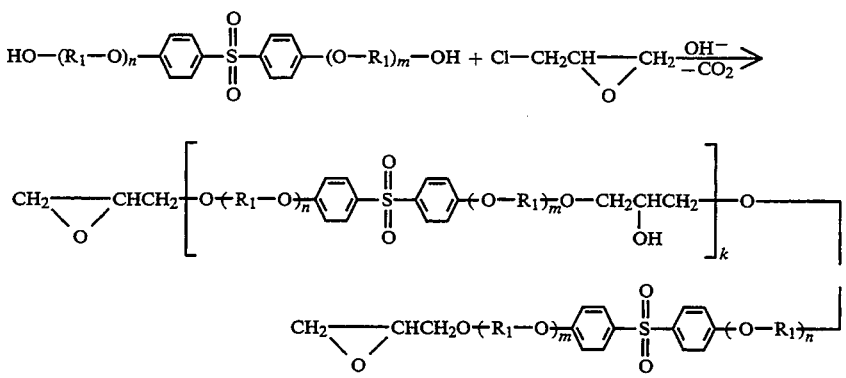

wherein $R_1$ is $C_2-C_4$ alkylene; m and n are 1–4 integer; and k is 1–5 integer.

The reaction between acrylic acid or methacrylic acid and diglycidyl ether of bisphenol-S or diglycidyl ether of oxyalkylene-extended bisphenol-S in said step b) or b') preferably is carried our in the presence of a catalyst and at a temperature of 80°–120° C., preferably 90°–110° C. Suitable catalysts include tertiary amines, Lewis acid, tertiary phosphines and the like, such as triethyleneamine, dimethylbenzylamine, $BF_3$ or triphenylphosphine. The amount of the catalyst used is 0.05–2.0 wt % based on the reactants, preferably 0.1–1 wt %. A polar solvent is required in this reaction when the diglycidyl ether of bisphenol-S or diglycidyl ether of oxyalkylene-extended bisphenol-S used is solid. Examples of the polar solvents suitable for using in this reaction are dioxane, tetrahydrofuran (THF), acetone, and chloroform. Among them dioxane has the best dissolving ability. An inhibitor such as BHT, CuCl, MEHQ or hydroquinone is added to the reaction solution to inhibit the polymerization of the reactants. This reaction is carried out for a period of 6–48 hours. The crude reaction product resulting from the reaction is washed with water and dried in vacuum to obtain a sticky liquid resin.

When ph groups of the acrylated bisphenol-S type epoxy resin of formula (I) are halophenylene, a cured product resulting from a crosslinking reaction of the resin (I) and a curing agent will have an excellent fire retarding property due to the halogen elements incorporated therein. 3,3', 5,5'-tetrabromo bisphenol-S of the following formula

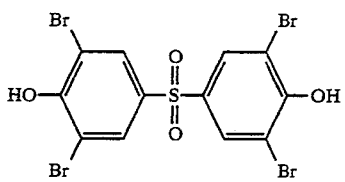

is a typical halogenated bisphenol-S used to prepare the acrylated bisphenol-S type epoxy resins of formula (I) wherein ph is halophenylene.

The acrylated epoxy resin based on bisphenol-S generated in the step b) or b') may be mixed with a stoichiometric amount of an UV or heat crosslinking agent to obtain an ink, adhesive or coating composition. The film formed by coating a thin layer of the composition on a substrate, drying and curing said layer has an excellent wet tack, flexibility, heat deformation resistance, solvent resistance and acid or alkali etching resistance. Moreover, it is observed that said cured film of acrylated bisphenol-S type epoxy resin has lifetime longer than that of acrylated bisphenol-A type epoxy resin at several different temperatures.

EXAMPLES OF THE INVENTION

The present invention can be illustrated in further details by the following examples. However, it should be noted that the scope of the present invention is not limited to these examples.

Example 1:

Preparation of Diglycidyl Ether of Bisphenol-S (DGEBS)

The diglycidyl ether of bisphenol-S (DGEBS) was prepared from epichlorohydrin (185.5 g, 2.0 mol) with bisphenol-S (50.0 g, 0.2 mol) in the presence of sodium hydroxide in flake form. The reaction mixture was refluxed at 115° C. with vigorously stirring for two hours while distilling off the water of reaction. After the reaction was completed, the hot solution was filtered in order to remove sodium chloride. The DGEBS product was crystallized out on cooling the filtrate. The product was washed with cold methanol and dried in vacuum at 60° C. for 24 hours. The product of bisphenol-S type epoxy resin was obtained. Bisphenol-S was supplied by Hailsun Chemical Company. All the other compounds were supplied by Janssen Chimica.

Preparation of Acrylated Diglycidyl Ether of Bisphenol-S

In a 500 ml four neck round-bottomed flask equipped with a reflux condenser, stirrer, thermometer and nitrogen inlet, 18.3 g (0.05 mol) of diglycidyl ether of bisphenol-S, 7.20 g (0.10 mol) of acrylic acid, 50 ml of dioxane, 0.005 g of CuCl and 1 wt % of dimethylbenzylamine catalyst based on the reactants were added. The reaction mixture was heated to 80° C. under nitrogen for 24 hours. As the reaction completed, the crude product was washed with distilled water to remove residual acrylic acid and CuCl. The final product was dried in vacuum at 60° C. for 24 hours. A clear sticky liquid resin was obtained. The IR spectra of DGEBS and acrylated epoxy resin based on bisphenol-S are shown in FIG. 1. The band at 915 cm$^{-1}$ associated with the oxirane group of DGEBS [curve (a)] is replaced by a band at 1719 cm$^{-1}$ which is due to the carbonyl group of the ester formation during the acrylation of DGEBS [curve (b)]. One extra band at 1630 cm$^{-1}$ observed in the case of acrylated resin may be attributed to the acryloyl double bond. Table 1 shows the $^{13}$C-NMR spectra of acrylated DGEBS together with that of acrylated diglycidyl ether of bisphenol-A (Acrylated DGEBA; the diglycidyl ether of bisphenol-A is Shell 828 epoxy resin, Shell Chemical Co.). The number averaged molecular weight of acrylated DGEBS, Mn, is 541 measured by vapor pressure osmometer.

TABLE 1

| $^{13}$C-NMR chemical shifts for acrylated DGEBS and acrylated DGEBA. | | |
|---|---|---|
| carbon | acrylated DGEBS$^{a)}$ (ppm) | acrylated DGEBA$^{a)}$ (ppm) |
| 1 | 133.6 | 142.7 |
| 2 | 129.3 | 127.4 |
| 3 | 115.3 | 113.9 |
| 4 | 162.1 | 156.2 |
| 5 | 69.6 | 68.9 |
| 6 | 49.4 | 49.7 |
| 7 | 43.7 | 43.7 |
| 8 | 165.4 | 165.4 |
| 9 | 128.2 | 128.2 |
| 10 | 131.6 | 131.5 |
| 11 |  | 41.1 |
| 12 |  | 30.7 |

$^{a)}$solvent: DMSO-d$_6$ acrylated DGEBS:

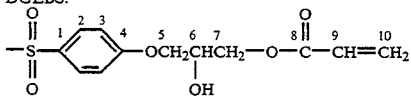

acrylated DGEBA:

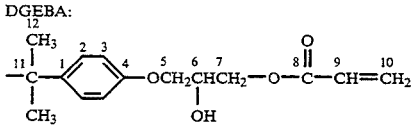

Example 2:

Preparation of Methacrylated Diglycidyl Ether of Bisphenol-S

Methacrylated diglycidyl ether of bisphenol-S was prepared in accordance with the procedures of Example 1 except that 8.6 g of methacrylic acid was used to replace 7.20 g of acrylic acid.

Example 3:

Preparation of Oxyethylene-Extended Bisphenol-S (Bisphenol-S EO)

A 500 ml round-bottomed flask, equipped with a flux condenser, stirrer, thermometer and nitrogen inlet, was charged with bisphenol-S (50 g, 0.2 mol), ethylene carbonate (35.2 g, 0.4 mol) and sodium carbonate (0.1 g) used as a catalyst. The mixture was heated to 185°–190° C. under nitrogen for two hours. The crude product was washed with water several times to remove unreacted ethylene carbonate and recrystallized from methanol. White crystalline product, m.p. 182.13° C.

Example 4:

Preparation of Diglycidyl Ether of Bisphenol-S EO (Bisphenol-S EO Epoxy)

The diglycidyl ether of oxyethylene-extended bisphenol-S (Bisphenol-S EO epoxy) was prepared from epichlorohydrin (92.5 g) with the oxyethylene-extended bisphenol-S prepared in Example 3 (92.5 g) in the presence of sodium hydroxide in flake form (8.8 g). The reaction mixture was refluxed at 110°–115° C. with vigorously stirring for two to four hours while distilling off the water of reaction. After the reaction was completed, the hot solution was filtered in order to remove sodium chloride, and then was subjected to a reduced pressure distillation to remove the excess amount of epichlorohydrin. The Bisphenol-S EO Epoxy product was obtained after drying.

Example 5:

Preparation of Acrylated Diglycidyl Ether of Bisphenol-S EO

In a 500 ml four neck round-bottomed flask equipped with a reflux condenser, stirrer, thermometer and nitrogen inlet, 22.7 g of diglycidyl ether of Bisphenol-S EO Epoxy prepared in Example 4, 7.20 g (0.10 mol) of acrylic acid, 50 ml of dioxane, 0.005 g of CuCl, and 1 wt % of dimethylbenzylamine catalyst based on the reactants were added. The acrylated diglycidyl ether of Bisphenol-S EO product was obtained by reacting the reaction mixture in accordance with the procedures similar to those of Example 1.

Example 6:

Preparation of Diglycidyl Ether of Oxypropylene-Extended Bisphenol-S (Bisphenol-S PO Epoxy)

The diglycidyl ether of oxypropylene-extended bisphenol-S (Bisphenol-S PO epoxy) was prepared from epichlorohydrin with the oxypropylene-extended bisphenol-S in the presence of sodium hydroxide in flake form. The procedures of Examples 3 and 4 were repeated except using propylene carbonate as an initial reactant.

Preparation of Acrylated Diglycidyl Ether of Bisphenol-S PO

In a 500 ml four neck round-bottomed flask equipped with a reflux condenser, stirrer, thermometer and nitrogen inlet, 24.1 g of diglycidyl ether of Bisphenol-S PO Epoxy, 7.20 g (0.10 mol) of acrylic acid, 50 ml of dioxane, 0.005 g of CuCl and 1 wt % of dimethylbenzylamine catalyst based on the reactants were added. The acrylated diglycidyl ether of Bisphenol-S PO product was obtained by reacting the reaction mixture in accordance with the procedures similar to those of Example 1.

Example 7:

The diglycidyl ether of bisphenol-S (DGEBS) resin, diglycidyl ether of oxyethylene-extended bisphenol-S (Bisphenol-S EO Epoxy) resin, diglycidyl ether of oxypropylene-extended bisphenol-S (Bisphenol-S PO Epoxy) resin, and the acrylated derivatives thereof obtained in Examples 1–6 were analyzed by Du pont 9900 differential scanning calorimeter to measure their glass transition temperatures (Tg). The results are listed in the following Table 2, wherein Tg of several commercial epoxy resins are also listed for comparison.

TABLE 2

| Resins | Tg, °C. |
| --- | --- |
| DGEBS | 12.31 |
| Bisphenol-S EO Epoxy | −8.18 |
| Bisphenol-S PO Epoxy | −19.91 |
| Acrylated DGEBS | −40.57 |
| Acrylated Diglycidyl Ether of Bisphenol-S EO | −55.77 |
| Acrylated Diglycidyl Ether of Bisphenol-S PO | −68.92 |
| Epikote 1001[a] | 29.00 |
| Epikote 1002[a] | 42.00 |
| Epikote 1004[a] | 53.00 |
| Epikote 1007[a] | 68.00 |

[a]Handbook of Epoxy Resins, p. 38, Japanese Industrial News Co. Published.

It can be seen from the data of Table 2 that Tg decreases when oxyethylene and oxypropylene units are incorporated into the epoxy resins.

Figure 2:
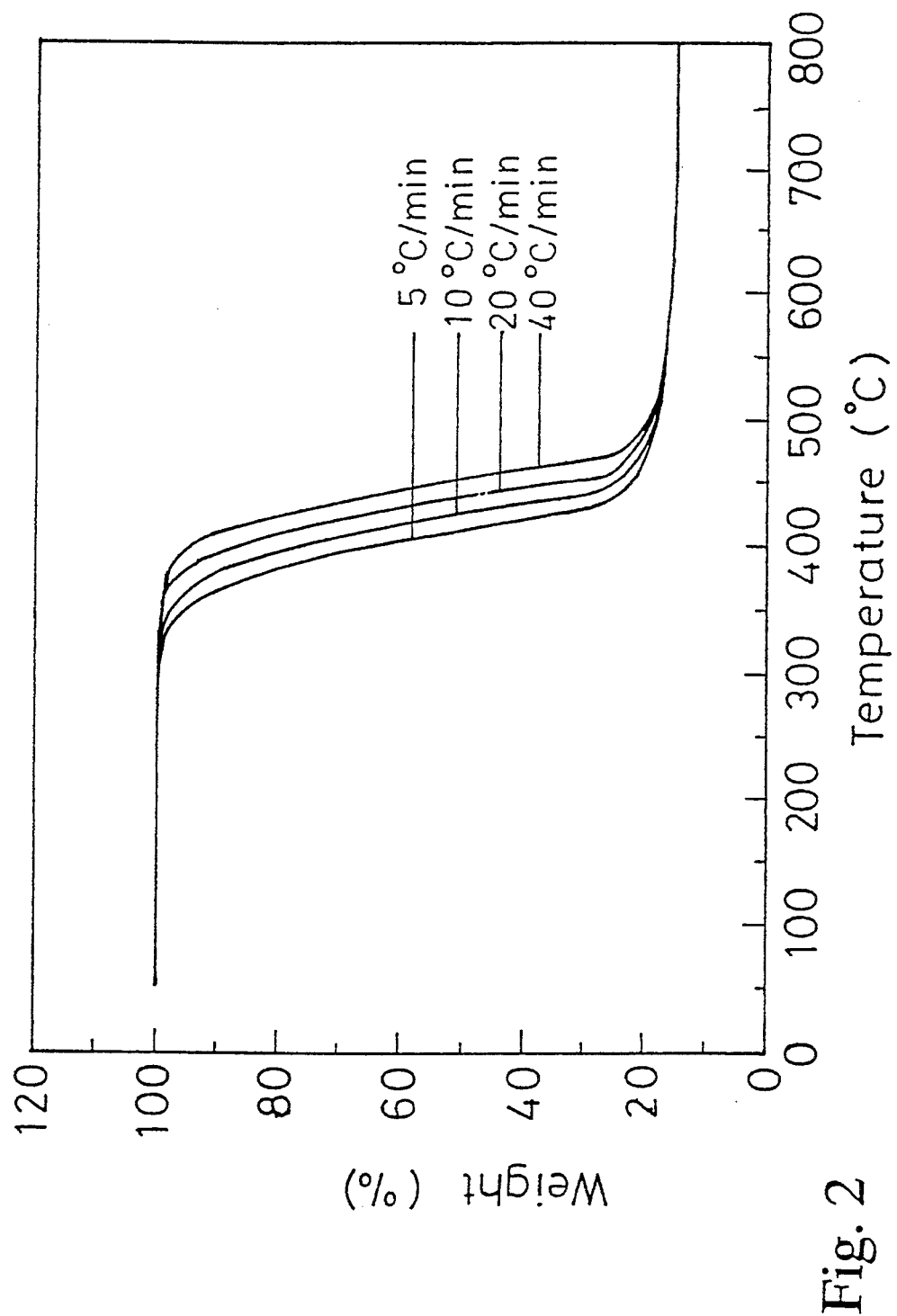
FIG. 2 is the thermogravimetric curve for acrylated diglycidyl ether of bisphenol-A at various heating rates in nitrogen atmosphere.
Figure 3:
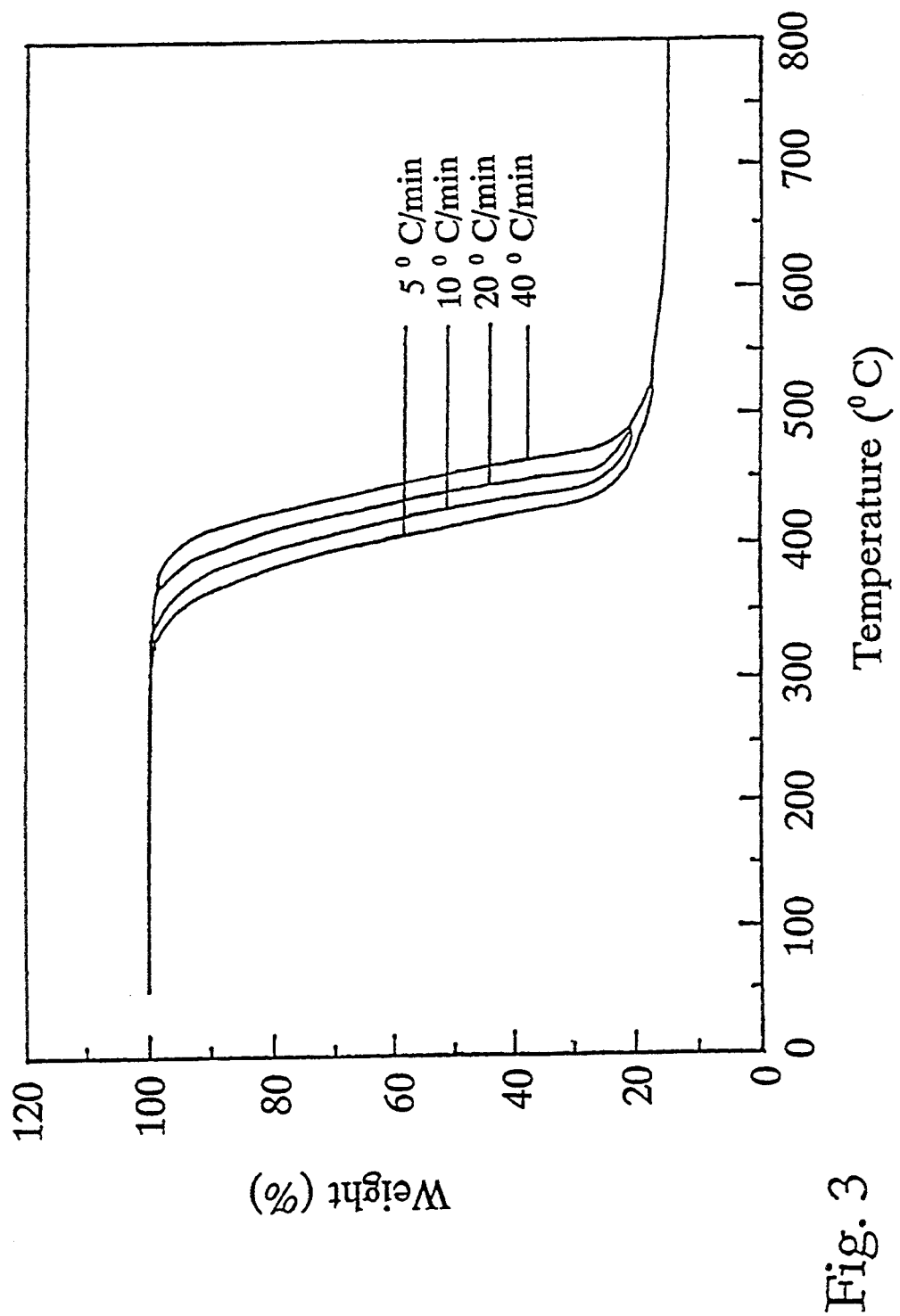
FIG. 3 is the thermogravimetric curve for acrylated diglycidyl ether of bisphenol-S at various heating rates in nitrogen atmosphere.
Figure 4:
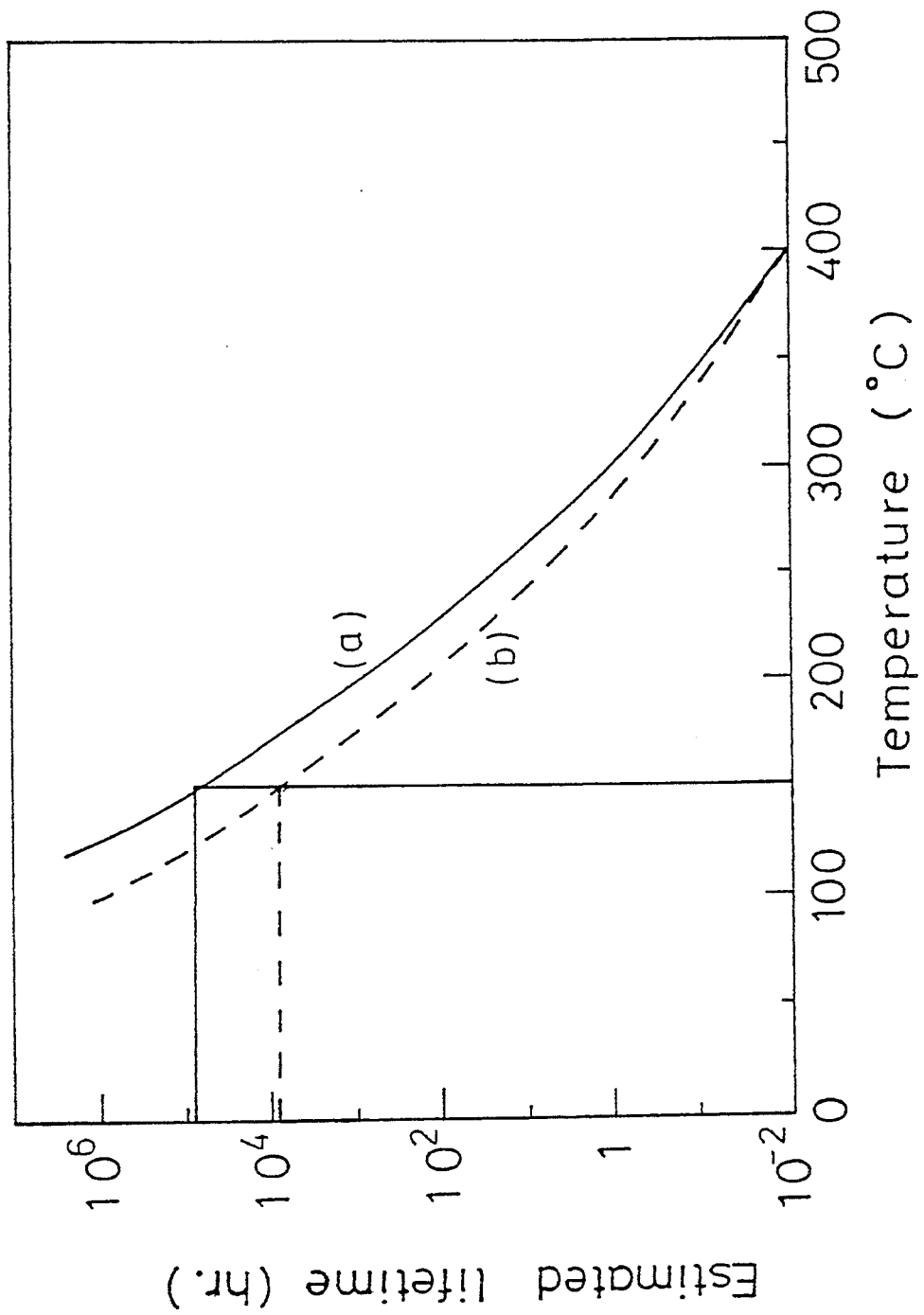
FIG. 4 shows the lifetime curves for acrylated diglycidyl ether of bisphenol-S, curve (a), and acrylated diglycidyl ether of bisphenol-A, curve (b), at various temperatures.

Example 8:

Study of Thermal Properties and Estimation the Lifetime of UV Cured Acrylated DGEBS Resin by TGA Decomposition The acrylated DGEBA and acrylated DGEBS prepared in Example 1 were separately mixed with 0.5 wt % benzoin isopropyl ether used as a photoinitiator, coated on a glass plate, and then cured by a high-pressure mercury lamp irradiation (600 W) at a distance of 12 cm for 30 seconds. Upon the completion of the curing reaction, about 10 mg of the cured film was heated with temperature-programmed heating rate through its decomposition region. The specimen weight loss was recorded as a function of temperature. FIGS. 2 and 3 show the thermal decomposition weight loss functions of acrylated DGEBA and DGEBS at different heating rates respectively. The activation energy of acrylated DGEBA and acrylated DGEBS was determined by Ozawa's method for a given value of weight fraction (wt %) (T. Ozawa, Bull. Chem. Soc. Jpn., 38, 1881 (1965)), and shown in Table 3. This activation energy was used to estimate lifetime at a given temperature (C. D. Doyle, J. Appl. Polym. Sci., 6, 639 (1962): D. J. Toop, IEEE Trans, Elec. Inc., EI-6, 2 (1971)). The results of the estimated lifetime for acrylated DGEBA and acrylated DGEBS at various temperatures are shown in FIG. 4. as curve (b) and (a), respectively. It is observed that acrylated diglycidyl ether of bisphenol-S (acrylated DGEBS) has longer lifetime than acrylated diglycidyl ether of bisphenol-A (acrylated DGEBA) at any given temperature, for example the lifetime of acrylated DGEBS is 10 times longer than that of acrylated DGEBA at 150° C., indicating that the former has better thermal stability than the latter.

TABLE 3

| | Activation energy, KJ/mole | |
| --- | --- | --- |
| Conversion, % | Acrylated DGEBS | Acrylated DGEBA |
| 5 | 152.67 | 129.38 |
| 10 | 155.67 | 147.59 |
| 20 | 175.15 | 146.20 |
| 20 | 197.97 | 170.34 |
| 40 | 199.49 | 162.37 |
| 50 | 194.91 | 176.95 |
| 60 | 197.72 | 174.17 |
| 70 | 233.94 | 181.45 |
| 80 | 378.19 | 202.01 |

Example 9:

Compositions A, B, C, D and E were prepared according to the formulas listed in the following Table 4. Each of the compositions was coated on a glass plate to form a film and then cured by the same conditions used in Example 8. The gloss and organic solvent resistance of the cured film were tested. The results are shown in Table 4.

TABLE 4

| Components | Composition, parts by weight | | | | |
|---|---|---|---|---|---|
| | A | B | C | D | E |
| trimethylol propane triacrylate | 20 | 20 | 20 | 20 | 20 |
| tripropylene glycol diacrylate | 20 | 20 | 20 | 20 | 20 |
| polyethylene glycol-200 diacrylate | 25 | 25 | 20 | 20 | 20 |
| dimethyl ethanol amine | 2.5 | 2.5 | 2.5 | 2.5 | 2.5 |
| benzophenone | 2.5 | 2.5 | 2.5 | 2.5 | 2.5 |
| Acrylated DGEBA | 30 | — | — | — | 15 |
| Acrylated DGEBS | — | 30 | — | — | 15 |
| Acrylated bisphenol-S EO epoxy | — | — | 30 | — | — |
| Acrylated bisphenol-S PO epoxy | — | — | — | 30 | — |
| Gloss (60° C.)[a] | 77 | 76 | 79 | 79 | 77 |
| MEK double rub, pass[b] | 230+ | 1200+ | 700+ | 750+ | 680+ |

[a] measured by gloss meter.
[b] the pass at which the cured film is damaged by rubbing with a cotton cloth adsorbing methyl ethyl ketone, wherein one back and forth cycle is counted as one pass.

The data of Table 4 show that compositions B, C, D and E which comprise acrylated bisphenol-S type epoxy resin have an improved MEK solvent resistance compared to composition A containing acrylated bisphenol-A type epoxy resin.

Example 10:

The purpose of this example is to illustrate the compositions B-E have a better storage stability than the composition A prepared in Example 9.

Each of the compositions A-E was mixed with 1000 ppm of MEHQ, and was stored at a temperature of 90° C. The gelling time of the stored compositions were recorded as follows:

| Composition | A | B | C | D | E |
|---|---|---|---|---|---|
| Gelling time (Day) | 3.5 | 6 | 7+ | 7+ | 5 |

The results show that the UV curable compositions containing acrylated bisphenol-S type epoxy resin, i.e. compositions B-E, have an improved storage stability in comparison with the UV curable composition containing acrylated bisphenol-A type epoxy resin, i.e. composition A.

What is claimed is:

1. An acrylated epoxy resin based on bisphenol-S having a formula as follows:

$$R_3-R_2-[O-(R_1-O)_n-ph-\underset{\underset{O}{\|}}{\overset{\overset{O}{\|}}{S}}-ph-(O-R_1)_m-OR_2]_k-O-$$

$$-(R_1-O)_n-ph-\underset{\underset{O}{\|}}{\overset{\overset{O}{\|}}{S}}-ph-(O-R_1)_m-OR_2-R_3$$

wherein:
ph is phenylene or halophenylene;
$R_1$ is $C_2$-$C_4$ alkylene;
$R_2$ is $-CH_2CH(OH)CH_2-$;
$R_3$ is acryloyl or methacryloyl;
m is an integer between 0 and 4, n is an integer between 0 and 4, and k is an integer between 0 and 5.

2. An acrylated epoxy resin based on bisphenol-S according to claim 1, wherein ph is phenylene.

3. An acrylated epoxy resin based on bisphenol-S having a formula as follows:

$$R_3-R_2-[O-(R_1-O)_n-ph-\underset{\underset{O}{\|}}{\overset{\overset{O}{\|}}{S}}-ph-(O-R_1)_m-OR_2]_k-O-$$

$$-(R_1-O)_n-ph-\underset{\underset{O}{\|}}{\overset{\overset{O}{\|}}{S}}-ph-(O-R_1)_m-OR_2-R_3$$

wherein:
ph is phenylene or halophenylene;
$R_1$ is $C_2$-$C_4$ alkylene;
$R_2$ is $-CH_2CH(OH)CH_2-$;
$R_3$ is acryloyl or methacryloyl;
m is an integer between 1 and 4, n is an integer between 1 and 4, and k is an integer between 0 and 5.

4. The acrylated epoxy resin based on bisphenol-S according to claim 3, wherein ph is phenylene.

5. The acrylated epoxy resin based on bisphenol-S according to claim 3, wherein $R_1$ is ethylene.

6. The acrylated epoxy resin based on bisphenol-S according to claim 3, wherein $R_1$ is propylene.

* * * * *